Aug. 11, 1959  W. F. ASHWORTH  2,898,656
FASTENING DEVICE
Filed Oct. 31, 1957
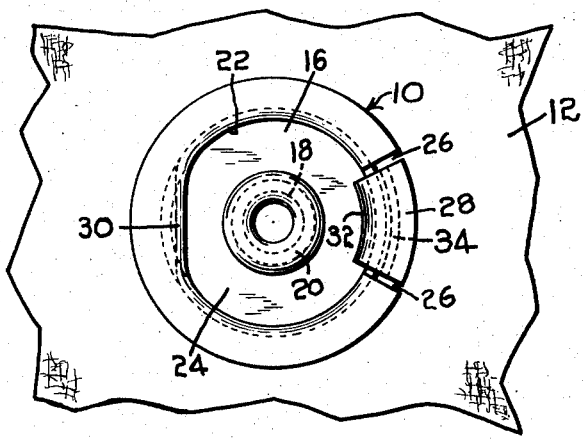
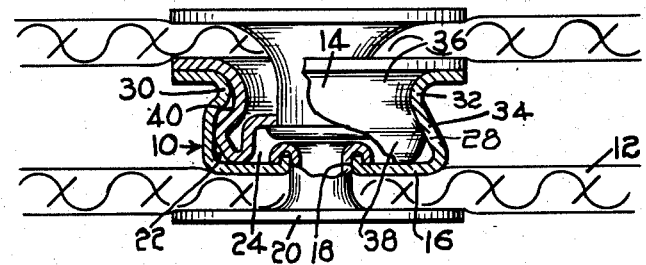
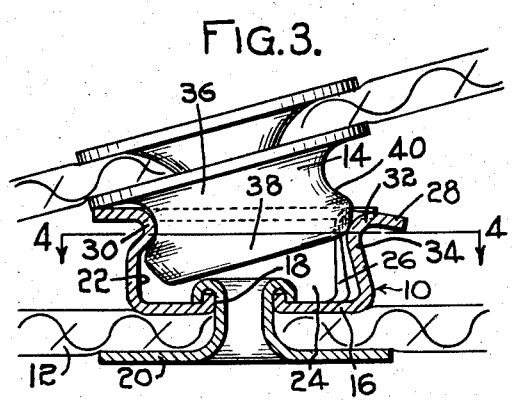
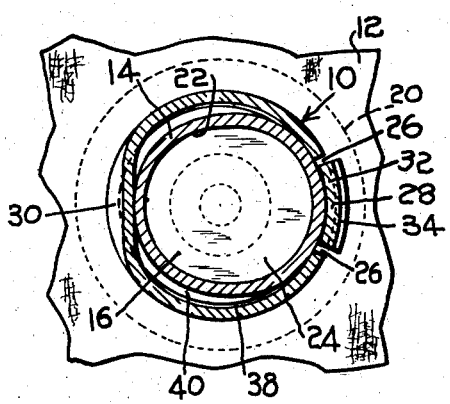
INVENTOR:
WINTHROP F. ASHWORTH,
BY Walter J. Jones
ATTORNEY.

United States Patent Office 2,898,656
Patented Aug. 11, 1959

2,898,656

FASTENING DEVICE

Winthrop Foster Ashworth, Wenham, Mass., assignor to United-Carr Fastener Corporation, Cambridge, Mass., a corporation of Delaware Application October 31, 1957, Serial No. 693,654

1 Claim. (Cl. 24—217)

This invention relates generally to fastening devices and has particular reference to a snap fastener socket member of the three-side lock type.

Previously known snap fastener sockets of this general type used some form of a separate spring member which was not integral with the socket or in the case where the spring member was integral with the socket, it was difficult to manufacture and would not retain its resiliency on use.

The object of this invention is to provide a one piece snap fastener socket which is not rendered inoperative by the presence of mud, sand or the like.

A further object of the invention is to provide a one piece snap fastener socket of the three-side lock type embodying a resilient tab formed from the wall of the socket, and integral with the base of the socket.

Other objects of the invention will, in part, be obvious, and will, in part, appear hereinafter.

In the drawing:

Fig. 1 is a plan view of a snap fastener socket embodying the features of the invention;

Fig. 2 is a longitudinal view partly in section of the socket with the stud assembled therein;

Fig. 3 is a view in section of the socket illustrating the action thereof during engagement wtih a stud;

Fig. 4 is a view in section taken on line 4—4 of Fig. 3.

Referring to the drawing, there is illustrated a snap fastener socket 10 attached to a supporting sheet 12 for receiving a shouldered stud 14 in snapping engagement. The socket 10 in the embodiment illustrated is of the three-side lock type, that is, an assembled stud can be removed from the socket by a separating force applied only on the side at which the resilient tab engages the stud and at no other point on the periphery of the socket. The socket 10 comprises generally a base 16, having a central opening 18 for receiving an attaching means, such as an attaching rivet 20, and a peripheral upstanding wall 22 forming a stud receiving cavity 24.

The wall 22 is provided with a pair of vertical slots 26 forming a resilient tab 28, directly opposite a stud locking shoulder 30, which tab embodies a stud-engaging shoulder 32 and an inwardly projecting portion 34 adjacent to the stud engaging shoulder 32.

To impart a three-side lock feature to the socket, a portion of the wall 22 on the side opposite the resilient tab 28 is embossed inwardly in spaced relation to the base 16 to form a stud locking shoulder 30 which projects into the cavity 24 and which extends a predetermined distance circumferentially and is faired gradually into the socket wall.

The stud 14 comprises a reduced neck 36 and an enlarged head 38 forming a stud shoulder 40. The stud 14 is assembled into the socket 10 by tilting the stud into the socket so that a portion of the stud shoulder 40 is below and engaging the stud locking shoulder 30 as best shown in Fig. 3. The other side of the stud shoulder is then pressed against the top of the resilient tab 28 forcing it away from the stud 14 and allowing the head 38 to pass into the socket.

Since certain other obvious modifications may be made in this device without departing from the scope of the invention, it is intended that all matters contained herein be interpreted in an illustrative and not in a limiting sense.

I claim:

A one piece three side lock snap fastener socket comprising a cup-shaped body having a base and an upstanding rigid peripheral wall disposed on the base, forming a stud-receiving cavity, an outwardly turned flange on said wall spaced from the base, said wall having a rigid inwardly rounded stud-locking shoulder adjacent the flange and projecting into the cavity on one side of the socket and a pair of slots in the wall normal to the plane of said base and located on the opposite side of the said wall from the locking shoulder thereof forming a resilient tongue between the slots, said tongue having an inwardly extending stud engaging shoulder and being moveable in and out of the stud receiving socket.

References Cited in the file of this patent

UNITED STATES PATENTS

| | | |
|---|---|---|
| 487,690 | Adams | Dec. 6, 1892 |
| 2,648,885 | Jones | Aug. 18, 1953 |
| 2,767,454 | Johnson | Oct. 23, 1956 |